(12) United States Patent
Schram et al.

(10) Patent No.: US 10,703,588 B1
(45) Date of Patent: Jul. 7, 2020

(54) BIN SWEEP SYSTEM WITH PARTICLE AGGLOMERATION BREAKUP CAPABILITY

(71) Applicant: SIOUX STEEL COMPANY, Sioux Falls, SD (US)

(72) Inventors: Michael Schram, Plattsmouth, NE (US); Jon Duesterhoeft, Sioux Falls, SD (US)

(73) Assignee: Sioux Steel Company, Sioux Falls, SD (US)

( * ) Notice: Subject to any disclaimer, the term of this patent is extended or adjusted under 35 U.S.C. 154(b) by 123 days.

(21) Appl. No.: 15/961,021

(22) Filed: Apr. 24, 2018

Related U.S. Application Data

(60) Provisional application No. 62/489,564, filed on Apr. 25, 2017.

(51) Int. Cl.
*B65G 65/42* (2006.01)

(52) U.S. Cl.
CPC .................................. *B65G 65/42* (2013.01)

(58) Field of Classification Search
CPC ...... B65G 65/42; B65G 65/425; B65G 65/46; B65G 65/466
See application file for complete search history.

(56) References Cited

U.S. PATENT DOCUMENTS

| | | | |
|---|---|---|---|
| 822,547 A | 6/1906 | Nicolson |
| 2,646,023 A | 7/1953 | Virgil |
| 2,722,305 A | 11/1955 | McCabe |
| 2,763,362 A | 9/1956 | Greaves |
| 2,801,137 A | 7/1957 | Clay |
| 3,014,575 A | 12/1961 | Klein |
| 3,035,718 A | 5/1962 | Behlen |
| 3,065,996 A | 11/1962 | Patz |
| 3,067,914 A | 12/1962 | Ellaby |

(Continued)

FOREIGN PATENT DOCUMENTS

| | | |
|---|---|---|
| CA | 2312068 | 12/2001 |
| FR | 1032110 | 6/1953 |

(Continued)

OTHER PUBLICATIONS

G & G Manufacturing SC-X 4 Ratchet Slip Clutches, Jun. 17, 2012, https://web.archive.org/web/20120617003451/http://www.ggmfg.com/Products/CouplersClutches/SCX4RatchetSlipClutches.aspx.

(Continued)

*Primary Examiner* — Jonathan Snelting
(74) *Attorney, Agent, or Firm* — Jeffrey A. Proehl; Woods, Fuller, Shultz & Smith, PC

(57) ABSTRACT

A bin sweep system for moving particulate matter across a floor surface of a bin may include a sweep assembly positionable on the floor surface of the bin and movable across the floor surface. The sweep assembly has an inboard end for locating toward to a central area of the bin and an outboard end for locating toward a peripheral area of the bin, and a forward side oriented toward a direction of movement for orienting toward particulate matter to be moved. The system may also include a particle agglomeration breakup assembly configured to expel a fluid adjacent to the sweep assembly to impact particulate matter located adjacent to the forward side of the sweep assembly and facilitate breakup of any particle agglomerations positioned forwardly of the sweep assembly.

20 Claims, 4 Drawing Sheets

(56) References Cited

U.S. PATENT DOCUMENTS

| | | | |
|---|---|---|---|
| 3,175,676 A | 3/1965 | Vander Schaaf | |
| 3,181,715 A | 5/1965 | Olson | |
| 3,204,786 A | 9/1965 | Kucera | |
| 3,228,514 A | 1/1966 | Kucera | |
| 3,229,665 A | 1/1966 | Baltz | |
| 3,229,827 A | 1/1966 | Kucera | |
| 3,231,106 A | 1/1966 | Bruecker | |
| 3,291,325 A | 12/1966 | Henningson | |
| 3,338,636 A | 8/1967 | Chapman | |
| 3,438,517 A | 4/1969 | Steffen | |
| 3,451,567 A | 6/1969 | Laidig | |
| 3,455,470 A | 7/1969 | Kanagy | |
| 3,472,357 A | 10/1969 | Strocker | |
| 3,486,643 A | 12/1969 | Smith | |
| 3,532,232 A | 10/1970 | Sukup | |
| 3,647,094 A | 3/1972 | Jackson | |
| 3,828,916 A | 8/1974 | Patz | |
| 3,838,780 A | 10/1974 | Ridlehuber | |
| 3,908,840 A | 9/1975 | Lambert | |
| 3,946,496 A | 3/1976 | Sukup | |
| 3,946,861 A | 3/1976 | Sandefur | |
| 3,974,908 A | 8/1976 | Keichinger | |
| 4,022,335 A | 5/1977 | Lambert | |
| RE29,309 E | 7/1977 | Patterson | |
| RE29,386 E * | 9/1977 | Miksitz | B65G 65/4863 222/404 |
| 4,057,151 A | 11/1977 | Weaver | |
| 4,242,028 A | 12/1980 | Van Dusen | |
| 4,313,705 A | 2/1982 | Jackson | |
| 4,329,105 A | 5/1982 | Buschbom | |
| 4,516,898 A | 5/1985 | Cantenot | |
| 4,578,012 A | 3/1986 | Petit | |
| 4,585,385 A | 4/1986 | Buschbom | |
| 4,619,330 A | 10/1986 | Machnee | |
| 4,619,577 A | 10/1986 | Swanson | |
| 4,655,666 A | 4/1987 | Cantenot | |
| 4,658,911 A | 4/1987 | Drever | |
| 4,669,941 A | 6/1987 | West | |
| 4,762,220 A | 8/1988 | Lutke | |
| 4,773,808 A | 9/1988 | Fischer | |
| 4,775,278 A | 10/1988 | Fischer | |
| 4,824,313 A | 4/1989 | Schiltz | |
| 4,875,820 A | 10/1989 | Lepp | |
| 4,998,855 A | 3/1991 | Tschernatsch | |
| 5,088,871 A | 2/1992 | Mellish | |
| 5,098,247 A * | 3/1992 | Campbell | B65G 65/22 414/326 |
| 5,099,983 A | 3/1992 | Valdez | |
| 5,180,272 A * | 1/1993 | Campbell | B65G 65/22 198/518 |
| 5,186,596 A | 2/1993 | Boucher | |
| 5,203,802 A | 4/1993 | Denis | |
| 5,639,200 A | 6/1997 | Jiskoot | |
| 5,769,590 A | 6/1998 | Weikel | |
| 5,788,055 A | 8/1998 | Stewart | |
| 5,944,168 A * | 8/1999 | Campbell | B65G 65/466 198/519 |
| 5,947,261 A | 9/1999 | Baker | |
| 6,017,180 A | 1/2000 | Wilham | |
| 6,039,647 A | 3/2000 | Weikel | |
| 6,095,742 A * | 8/2000 | Campbell | B65G 65/466 198/493 |
| 6,203,261 B1 | 3/2001 | South | |
| 6,254,329 B1 | 7/2001 | Sukup | |
| 6,280,331 B1 | 8/2001 | Tuttlebee | |
| 6,281,610 B1 | 8/2001 | Kliman | |
| 6,499,930 B1 | 12/2002 | Dixon | |
| 6,619,473 B2 | 9/2003 | Romeo | |
| 6,640,451 B1 | 11/2003 | Vinarcik | |
| 6,672,342 B2 * | 1/2004 | Nussbaumer | B65D 88/66 141/348 |
| 6,948,902 B2 | 9/2005 | Hanig | |
| 7,210,538 B2 | 5/2007 | Gust | |
| 7,544,031 B2 | 6/2009 | Kaeb | |
| 7,588,405 B2 | 9/2009 | Johnson | |
| 7,967,542 B2 | 6/2011 | Epp | |
| 8,657,025 B2 | 2/2014 | Thompson | |
| 8,770,388 B1 | 7/2014 | Chaon | |
| 9,120,633 B2 | 9/2015 | Ahlen | |
| 9,199,807 B1 | 12/2015 | Schuelke | |
| 9,288,946 B1 | 3/2016 | Schuld | |
| 9,290,335 B1 | 3/2016 | Witt | |
| 9,862,545 B2 | 1/2018 | Kaeb | |
| 2004/0146381 A1 | 7/2004 | Hanson | |
| 2004/0213650 A1 | 10/2004 | Epp | |
| 2005/0254922 A1 | 11/2005 | Berreau | |
| 2005/0263372 A1 | 12/2005 | Hollander | |
| 2006/0245864 A1 | 11/2006 | Epp | |
| 2006/0285942 A1 | 12/2006 | Fridgen | |
| 2009/0041566 A1 | 2/2009 | Lambertini | |
| 2010/0239399 A1 | 9/2010 | Hoogestraat | |
| 2013/0064629 A1 | 3/2013 | Schuelke | |
| 2013/0216341 A1 | 8/2013 | Luster | |
| 2015/0225190 A1 | 8/2015 | Witt | |
| 2016/0052719 A1 * | 2/2016 | Ganzer | B29B 13/022 198/617 |

FOREIGN PATENT DOCUMENTS

| | | |
|---|---|---|
| FR | 2309442 | 11/1976 |
| FR | 2348132 | 11/1977 |
| FR | 2630620 | 11/1989 |
| GB | 1327791 | 8/1973 |
| GB | 2069448 | 8/1981 |
| GB | 2076357 | 12/1981 |

OTHER PUBLICATIONS

Sudenga Industries, Inc., Press Release, Nov. 1, 2004, pp. 1-3.
Wen-Bin Du, Qun Fang, Qiao-Hong He, and, and Zhao-Lun Fang. "High-Throughput Nanoliter Sample Introduction Microfluidic Chip-Based Flow Injection Analysis System with Gravity-Driven Flows", Analytical Chemistry 2005 77 (5), pp. 1330-1337.
Jayas, Digvir S., and Noel DG White. "Storage and drying of grain in Canada: low cost approaches." Food control 14.4 (2003): pp. 255-261.

* cited by examiner

US 10,703,588 B1

BIN SWEEP SYSTEM WITH PARTICLE AGGLOMERATION BREAKUP CAPABILITY

REFERENCE TO RELATED APPLICATIONS

This application claims the benefit of U.S. Provisional Patent Application No. 62/489,564, filed Apr. 25, 2017, which is hereby incorporated by reference in its entirety.

BACKGROUND

Field

The present disclosure relates to storage bin sweeps and more particularly pertains to a new bin sweep system which includes a particle agglomeration breakup assembly providing the capability for moving particles that have adhered to each other.

SUMMARY

The present disclosure relates to a bin sweep system for moving particulate matter across a floor surface of a bin. The system may comprise a sweep assembly positionable on the floor surface of the bin and movable across the floor surface. The sweep assembly has an inboard end for locating toward to a central area of the bin, an outboard end for locating toward a peripheral area of the bin, and a forward side oriented toward a direction of movement for orienting toward particulate matter to be moved. The system may also include a particle agglomeration breakup assembly configured to expel a fluid adjacent to the sweep assembly to impact particulate matter located adjacent to the forward side of the sweep assembly and facilitate breakup of any particle agglomerations positioned forwardly of the sweep assembly.

In another aspect, the present disclosure relates to a bin sweep system for moving particulate matter across a floor surface of a bin, and the system may comprise a sweep assembly positionable on the floor surface of the bin and movable across the floor surface. The sweep assembly has an inboard end for locating toward to a central area of the bin and an outboard end for locating toward a peripheral area of the bin, and a forward side oriented toward a direction of movement for orienting toward particulate matter to be moved. The sweep assembly may include a plurality of interconnected paddles movable in a succession on a path along at least a portion of the sweep assembly between the inboard and outboard ends. The plurality of paddles may be mounted on an endless loop member at spaced locations along the endless loop. The system may also include a particle agglomeration breakup assembly configured to expel a fluid adjacent to the sweep assembly to impact particulate matter located adjacent to the forward side of the sweep assembly and facilitate breakup of any particle agglomerations positioned forwardly of the sweep assembly.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
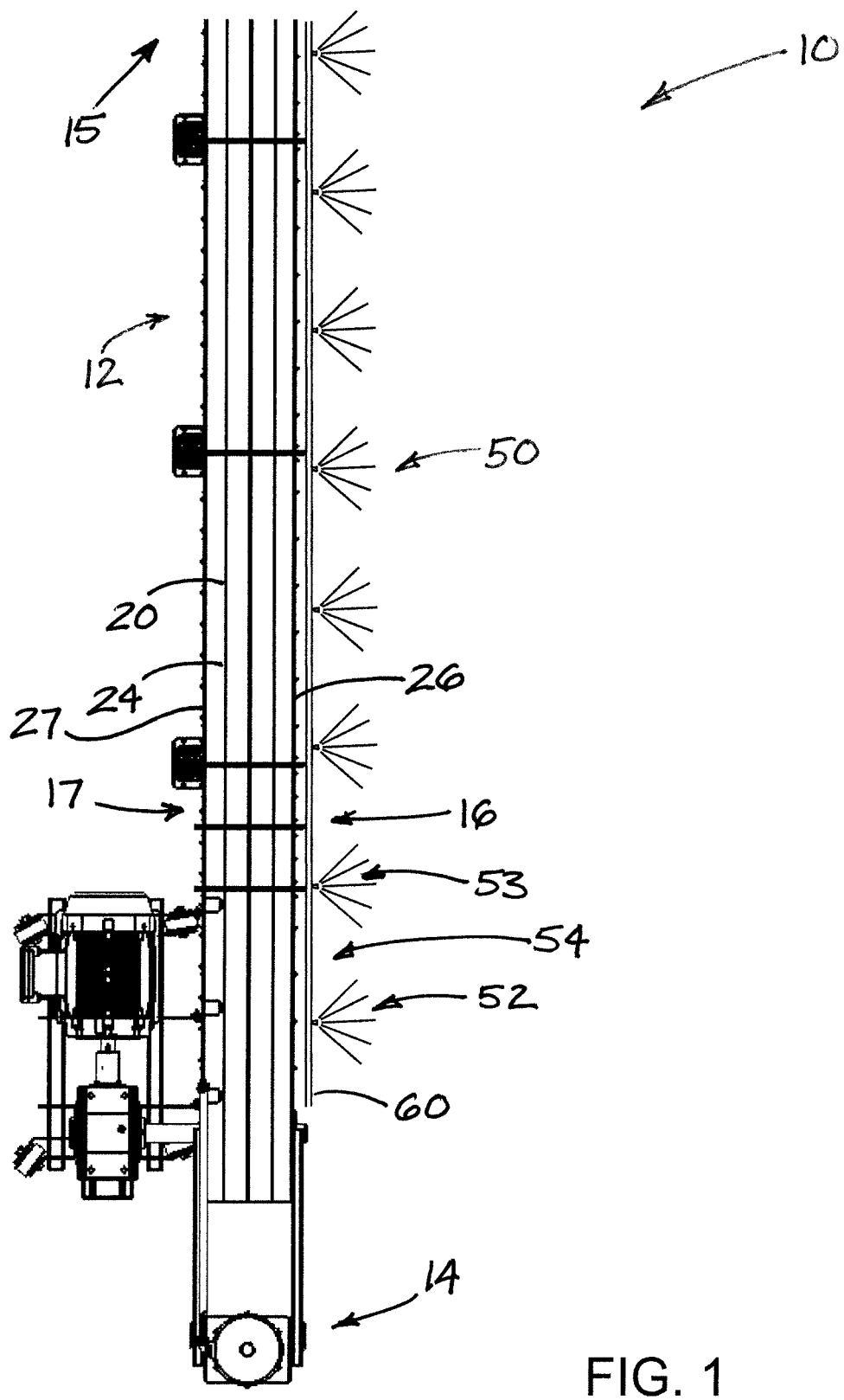
FIG. 1 is a schematic top view of a portion of a new bin sweep system with particle agglomeration breakup capability according to the present disclosure.
Figure 2:
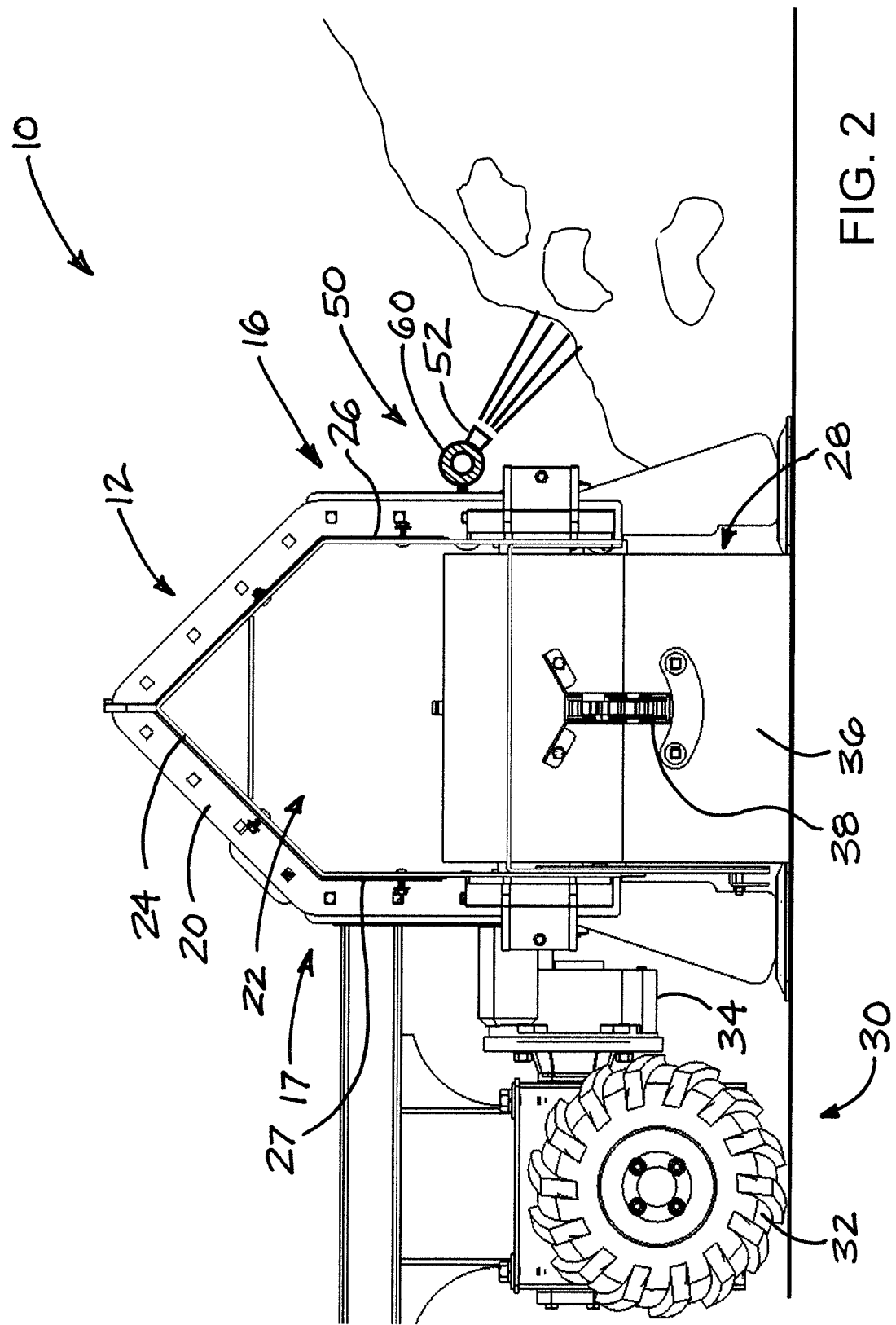
FIG. 2 is a schematic end sectional view of the bin sweep system, according to an illustrative embodiment.
Figure 3:
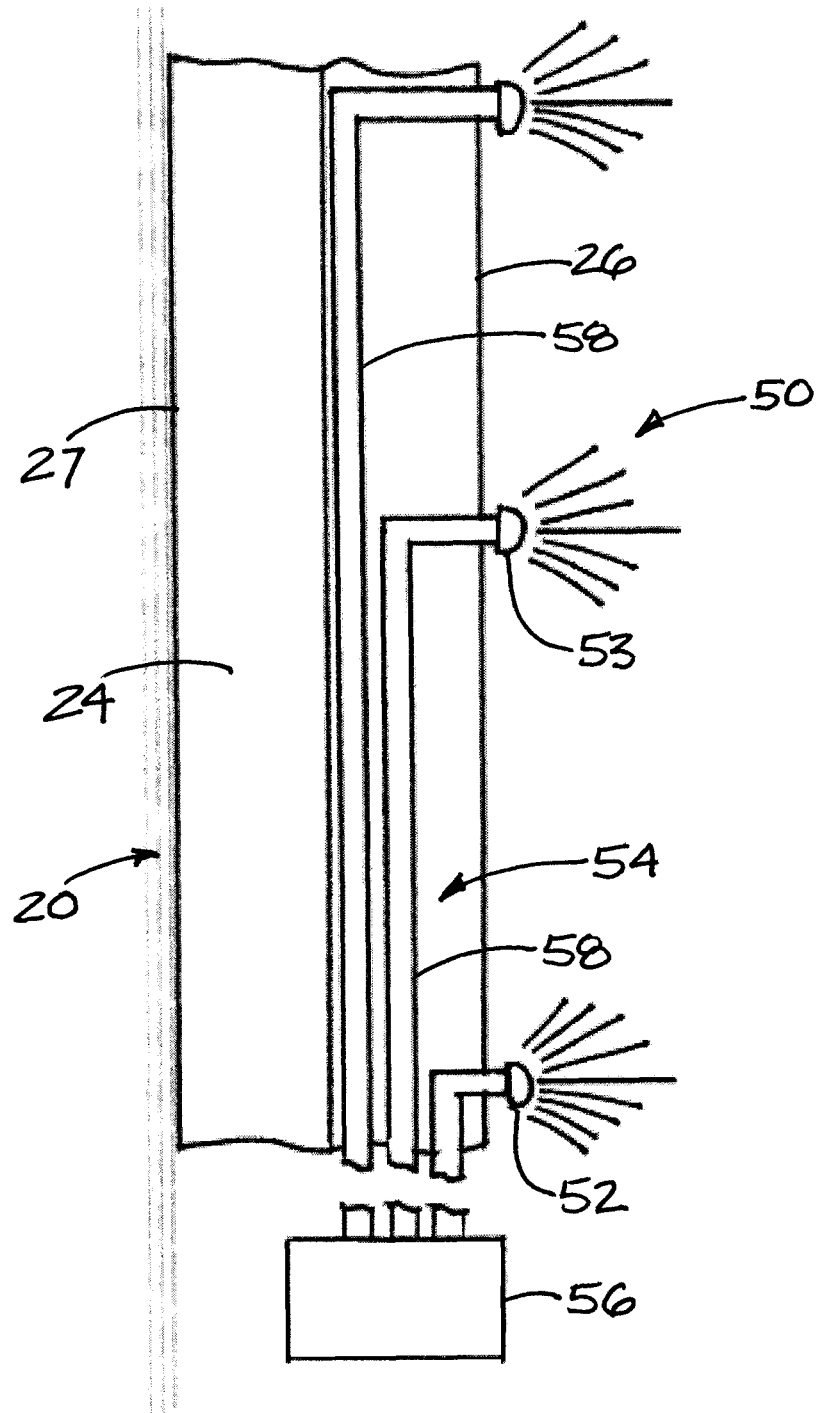
FIG. 3 is a schematic top view of a portion of a bin sweep system having one embodiment of a particle agglomeration breakup assembly, according to an illustrative embodiment.
Figure 4:
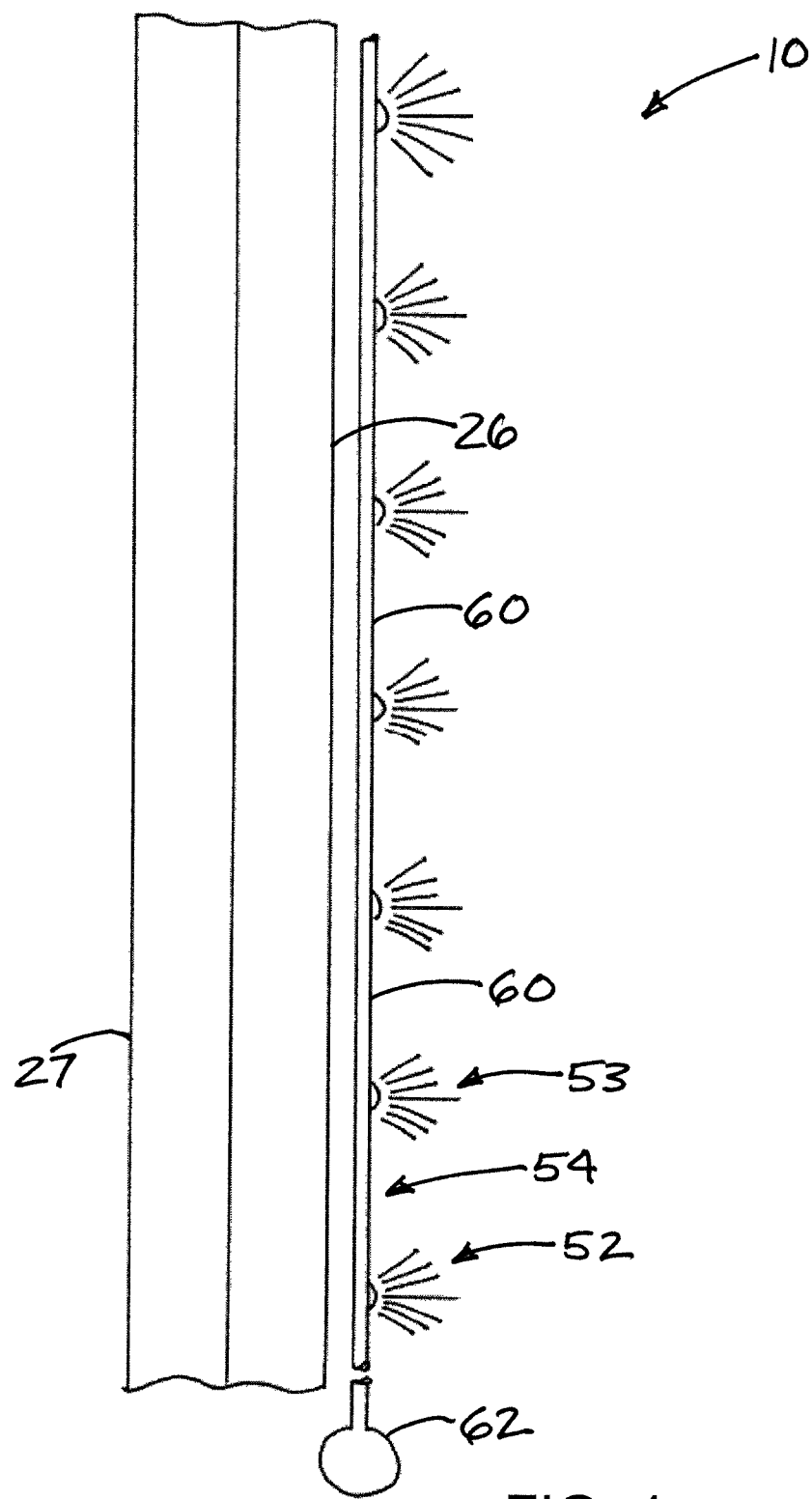
FIG. 4 is a schematic top view of a portion of a bin sweep having another embodiment of a particle agglomeration breakup assembly, according to an illustrative embodiment.

With reference now to the drawings, and in particular to FIGS. 1 through 4 thereof, a new bin sweep system with particle agglomeration breakup capability embodying the principles and concepts of the disclosed subject matter will be described.

The applicants have recognized that bin sweep systems are highly useful for clearing portions of the contents of a storage bin from the floor surface of the bin. However, the contents of the bin, and in particular agricultural grains held within the bin, are not always uniform throughout the pile within the bin. Environmental conditions as well as the passage of time can cause the grain particles to adhere together and form agglomerations distributed within the contents of the bin as well as as a crust over the top of the bin contents. These agglomerations of the grain particles can hamper the operation of the bin sweep as well as decrease the effectiveness of the bin sweep as the sweep mechanism attempts to intake and break up the agglomerations.

The applicants have also recognized that it would be highly useful for breaking up the agglomerations of particles to disperse or spray a fluid such as a pressurized gas into the particles located forwardly of the area on the bin sweep where the particles are taken in by the sweep. Dispensing of the pressurized gas tends to physically impact and break up the agglomerations into smaller agglomerations or individual particles which may be more easily handled by the bin sweep.

In one aspect, the disclosure relates to a storage bin sweep system 10 for moving particulate matter or particles across the surface of the floor of a storage bin, and typically a bin having a floor surface with a circular shape. Illustratively, the particulate matter may comprise a grain such as corn, soybeans, rice, and the like, but be useful for bins in which other types of particulate matter are stored.

The bin sweep system 10 may include a sweep assembly 12 which is positionable on the floor surface of the storage bin and is movable across the floor surface to engage the particulate matter resting on the floor surface or located adjacent to the floor surface in a pile. The sweep assembly 12 may have an inboard end 14 for locating toward or at a central area of the bin which may have a sump or well for receiving particulate matter to be conveyed under the floor surface to a location outside of the bin. The sweep assembly 12 may also have an outboard end 15 for locating toward a peripheral area of the bin, such as adjacent to the location of the side wall of the storage bin. The sweep assembly 12 may also have a forward side 16 which is generally oriented toward a direction of movement of the sweep assembly during operation and generally toward an accumulation or pile of the particulate matter. The sweep assembly 12 may also have a rearward side 17 which is generally oriented away from the direction of movement of the sweep assembly during sweep operation.

The sweep assembly 12 may include a housing 20 which defines an interior 22 of the housing. The housing may have a roof wall 24 which may be pitched downwardly and outwardly from a peak, and the housing may also have at least one side wall 26 which extends downwardly from the roof wall 24. In some embodiments, a pair of side walls 26, 27 may extend downwardly from the roof wall on either side of the interior, with each of the side walls being positioned at adjacent to one lateral portion of the roof wall. The pair of side walls may include a front side wall 26 which is generally located toward the forward side of the sweep assembly, and may be substantially vertically oriented. The housing may also include a rear side wall 27 which is generally located toward the rearward side of the sweep assembly, and may be oriented in a substantially vertical plane and be parallel to the front side wall. The housing 20 may have an opening 28 for receiving particulate matter lying on the floor surface or being located generally closely adjacent to the floor surface. The opening 28 may be located in the front side wall and may also be located at the bottom of the front side wall adjacent to the floor surface such that forward movement of the sweep assembly tends to bring the particulate matter on the floor surface toward and into the opening.

The sweep assembly 12 may also include a surface engaging portion 30 configured to engage the floor surface of the bin below the sweep assembly and move the sweep assembly with respect to the surface. In some embodiments, depending in part upon the overall length of the sweep assembly between the inboard 14 and outboard 15 ends, more than one surface engaging portion 30 may be employed at longitudinally spaced locations between the inboard and outboard ends on the sweep assembly. The surface engaging portion may comprise at least one surface engaging wheel 32, and optionally may include a pair of the wheels. The wheels may be rotatable about a substantially horizontally oriented axes extending generally parallel to the longitudinal axis of the sweep assembly. The wheels may be rotatable about the axis as a sweep assembly moves in a forward direction. The surface engaging portion 30 may also include a drivetrain 34 which is configured to transmit power to the surface engaging wheel.

The sweep assembly 12 may further include structure for moving the particulate matter along the length of the sweep assembly toward the inboard end. In some embodiments, the structure for moving the particulate matter may comprise a plurality of interconnected paddles 36 which are movable in a succession on a path extending along at least a portion of the sweep assembly between the inboard 14 and outboard 15 ends. The plurality of paddles 36 may be arrayed along a line extending between the inboard and outboard ends. The plurality of paddles 36 may be mounted on an endless loop member 38 at spaced locations along the length of the endless loop. The endless loop member 38 may comprise a series of interconnected links, and may comprise a plurality of chain links. At least a portion of the succession of interconnected paddles may be positioned in the interior of the housing. In some embodiments, the drivetrain 34 of the surface engaging portion 30 may be engaged by a portion of the endless loop member to drive or rotate the drivetrain and the surface engaging wheel when the paddles are moved by the endless loop member 38. Optionally, other structures for moving the particulate matter may be utilized.

The system 10 may also include a particle agglomeration breakup assembly 50 which is configured to expel a fluid adjacent to the sweep assembly 12 to impact any particulate matter, and in particular any particle agglomerations, positioned forwardly of and adjacent to the sweep assembly. In some of the most preferred implementations, the fluid comprises a gas such as environmental air. The breakup assembly 50 may be mounted on the sweep assembly 12 to move with the sweep assembly as the assembly 12 moves about the interior of the storage bin. The breakup assembly 50 may be positioned toward the forward side 16 of the sweep assembly, and may be positioned adjacent to the front side wall 26 of the housing.

The breakup assembly 50 may include at least one nozzle 52 positioned adjacent to the sweep assembly for dispensing the fluid or gas to locations adjacent to the front of the sweep assembly. The nozzle 52 may be directed forwardly with respect to the sweep assembly such that fluid flow from the nozzle is capable of impacting particles or agglomerations of particles positioned forwardly of the sweep assembly. The nozzle 52 may also be directed somewhat downwardly with respect to the sweep assembly such that fluid flow from the nozzle moves downwardly from the nozzle toward the floor surface of the bin. In some embodiments, the at least one nozzle may include a plurality of nozzles 52, 53 which may be positioned in an array along the length of the sweep assembly between the inboard and outboard ends. The nozzles may be spaced from each other in the longitudinal direction of the sweep assembly to distribute the influence of the nozzles along the length of the sweep assembly. The area or space of influence of each nozzle may overlap to some degree the area or space of influence of an adjacent nozzle in the array. The plurality of nozzles may be arrayed along the forward side 16 of the sweep assembly, and may be located in substantially the same horizontal plane at approximately the same vertical height or level above the floor surface. Each of the nozzles may have a spray pattern, and in some implementations, each of the nozzles may have a fan-shaped spray pattern of flow from the nozzle. In some implementations, the nozzles 52, 53 may be positioned sufficiently close to each other such that the fan patterns of adjacent nozzles in the array produce a degree of overlap of peripheral regions of the fan pattern to facilitate coverage that extends along the length of the sweep assembly substantially without any gaps. Illustratively, the spacing between adjacent nozzles may be in the range of approximately 1 foot to 2 foot, although other nozzle spacing distances may also be utilized.

The breakup assembly 50 may also include a conduit system 54 connected to the plurality of nozzles to provide and deliver the fluid to the nozzles. In some embodiments, the conduit system comprises a manifold 56 and a plurality of individual conduits 58, with each of the conduit connecting one of the nozzles directly to the manifold in a "homerun" arrangement to facilitate the provision of fluid or gas at substantially equal pressures to each of the nozzles along the length of the sweep assembly. In other embodiments, the conduit system 54 may comprise a common conduit 60 with each of the nozzles of the plurality of nozzles being in communication with the common conduit. The common conduit may extend along at least a portion of the sweep assembly and each of the nozzles may be mounted on the common conduit such that the nozzle is in fluid communication with the interior of the conduit and air carried in the conduit may be passed through the nozzles. In some embodiments, the apertures of the nozzles may be sized in a manner that is suitable to substantially equalize the velocity or flow rate of the fluid out of the nozzles along the length of the common conduit so that some of the nozzles do not provide greater velocity or flow rate than other nozzles. The breakup assembly 50 may also include a fluid source which is configured to provide fluid to the conduit system and the plurality of nozzles. The fluid source may comprise a tank of compressed air, or a gas or air compressor that is in fluid communication through suitable conduits to the manifold 56 or the common conduit 60.

It will be recognized that elements of the breakup assembly 50 may be integrated into the sweep assembly, such as into the housing of the sweep assembly so that some or all of the conduits are contained within the interior of the housing and the nozzles are located on the front side wall 26 of the housing. Also, elements of the breakup assembly 50 may be provided as a retrofit kit to be added or installed on sweep assemblies lacking this capability.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A bin sweep system for moving particulate matter across a floor surface of a bin, the system comprising:
   a sweep assembly positionable on the floor surface of the bin and movable across the floor surface, the sweep assembly having an inboard end for locating toward to a central area of the bin and an outboard end for locating toward a peripheral area of the bin and a longitudinal length between the inboard and outboard ends, the sweep assembly having a forward side oriented toward a direction of forward movement of the sweep assembly with respect to the floor surface to engage particulate matter to be moved by the sweep assembly; and
   a particle agglomeration breakup assembly mounted on the sweep assembly to move with the sweep assembly across the floor surface of the bin, the particle agglomeration assembly including a plurality of nozzles positioned on the sweep assembly at longitudinally spaced locations along the longitudinal length of the sweep assembly between the inboard and outboard ends to distribute an influence of the nozzles along the length of the sweep assembly, each nozzle of the plurality of nozzles being oriented on the sweep assembly to expel a fluid adjacent to the forward side of the sweep assembly along the longitudinal length of the sweep assembly to impact particulate matter located adjacent to the forward side of the sweep assembly at the positions of the nozzles along the longitudinal length of the sweep assembly and thereby facilitate breakup of any particle agglomerations positioned forwardly of the sweep assembly.

2. The system of claim 1 wherein the particle agglomeration breakup assembly is configured to expel a gas adjacent to the sweep assembly to impact particulate material.

3. The system of claim 1 wherein each nozzle of the plurality of nozzles is directed forwardly with respect to the forward side of the sweep assembly such that fluid flow from the nozzle is capable of impacting particles positioned forwardly of the sweep assembly.

4. The system of claim 3 wherein each nozzle of the plurality of nozzles is directed downwardly with respect to the sweep assembly such that fluid flow from the nozzle moves downwardly from the nozzle.

5. The system of claim 1 wherein the particle agglomeration breakup assembly includes a conduit system connected to the plurality of nozzles to provide a fluid to the nozzles.

6. The system of claim 5 wherein the particle agglomeration breakup assembly includes a fluid source configured to provide fluid to the conduit system and the plurality of nozzles.

7. The system of claim 1 wherein each nozzle of the plurality of nozzles has a spray pattern of flow from the nozzle, the spray pattern being a fan pattern.

8. The system of claim 7 wherein the nozzles are positioned on the sweep assembly sufficiently close to each other such that the fan patterns of adjacent nozzles in the array produce a degree of overlap of the fan patterns of the respective nozzles.

9. A bin sweep system for moving particulate matter across a floor surface of a bin, the system comprising:
   a sweep assembly positionable on the floor surface of the bin and movable across the floor surface, the sweep assembly having an inboard end for locating toward to a central area of the bin and an outboard end for locating toward a peripheral area of the bin, the sweep assembly having a forward side oriented toward a direction of forward movement of the sweep assembly with respect to the floor surface to engage particulate matter to be moved, the sweep assembly including a plurality of interconnected paddles movable in a succession on a path along at least a portion of the sweep assembly between the inboard and outboard ends, the plurality of paddles being mounted on an endless loop member at spaced locations along the endless loop;

a particle agglomeration breakup assembly including at least one nozzle positioned on the sweep assembly to expel a fluid adjacent to the forward side of the sweep assembly to impact particulate matter located adjacent to the forward side of the sweep assembly and facilitate breakup of any particle agglomerations positioned forwardly of the sweep assembly; and wherein the at least one nozzle has a spray pattern of flow from the nozzle, the spray pattern being a fan pattern.

10. The system of claim 9 wherein the particle agglomeration breakup assembly is configured to expel a gas adjacent to the sweep assembly to impact particulate material.

11. The system of claim 9 wherein the particle agglomeration breakup assembly is mounted on the sweep assembly to move with the sweep assembly.

12. The system of claim 9 wherein the at least one nozzle is directed forwardly with respect to the sweep assembly such that fluid flow from the nozzle is capable of impacting particles positioned forwardly of the sweep assembly.

13. The system of claim 12 wherein the at least one nozzle is directed downwardly with respect to the sweep assembly such that fluid flow from the nozzle moves downwardly from the nozzle.

14. The system of claim 12 wherein the at least one nozzle comprises a plurality of nozzles on the sweep, the nozzles of the plurality of nozzles being spaced from each other in a longitudinal direction of the sweep assembly between the inboard end and the outboard end of the sweep assembly.

15. The system of claim 14 wherein the particle agglomeration breakup assembly includes a conduit system connected to the plurality of nozzles to provide a fluid to the nozzles.

16. The system of claim 15 wherein the particle agglomeration breakup assembly includes a fluid source configured to provide fluid to the conduit system and the plurality of nozzles.

17. The system of claim 9 wherein the at least one nozzle comprises a plurality of nozzles on the sweep spaced from each other in a longitudinal direction of the sweep assembly, the nozzles being positioned on the sweep assembly sufficiently close to each other such that the fan patterns of adjacent nozzles in the array produce a degree of overlap of the fan patterns of the respective nozzles.

18. A bin sweep system for moving particulate matter across a floor surface of a bin, the system comprising:

a sweep assembly positionable on the floor surface of the bin and movable across the floor surface, the sweep assembly having an inboard end for locating toward to a central area of the bin and an outboard end for locating toward a peripheral area of the bin, the sweep assembly having a forward side oriented toward a direction of movement for orienting toward particulate matter to be moved; and a particle agglomeration breakup assembly configured to expel a fluid adjacent to the sweep assembly to impact particulate matter located adjacent to the forward side of the sweep assembly and facilitate breakup of any particle agglomerations positioned forwardly of the sweep assembly;

wherein the particle agglomeration breakup assembly includes at least one nozzle directed forwardly with respect to the sweep assembly such that fluid flow from the nozzle is capable of impacting particles positioned forwardly of the sweep assembly;

wherein the at least one nozzle comprises a plurality of nozzles on the sweep, the nozzles of the plurality of nozzles being spaced from each other in a longitudinal direction of the sweep assembly between the inboard end and the outboard end of the sweep assembly;

wherein the particle agglomeration breakup assembly includes a conduit system connected to the plurality of nozzles to provide a fluid to the nozzles; and wherein each of the nozzles has a spray pattern of flow from the nozzle, the spray pattern being a fan pattern.

19. The system of claim 18 wherein the particle agglomeration breakup assembly is mounted on the sweep assembly to move with the sweep assembly.

20. The system of claim 18 wherein the nozzles are positioned on the sweep assembly sufficiently close to each other such that the fan patterns of adjacent nozzles in the array produce a degree of overlap of the fan patterns of the respective nozzles.

\* \* \* \* \*